United States Patent
Grajcar et al.

(10) Patent No.: US 10,973,173 B2
(45) Date of Patent: Apr. 13, 2021

(54) LIGHT SOURCES ADAPTED TO SPECTRAL SENSITIVITY OF PLANTS

(71) Applicant: SIGNIFY NORTH AMERICA CORPORATION, Somerset, NJ (US)

(72) Inventors: Zdenko Grajcar, Orono, MN (US); Kevin Payne, Brecksville, OH (US)

(73) Assignee: SIGNIFY NORTH AMERICA CORPORATION, Somerset, NJ (US)

( * ) Notice: Subject to any disclaimer, the term of this patent is extended or adjusted under 35 U.S.C. 154(b) by 54 days.

(21) Appl. No.: 16/018,556

(22) Filed: Jun. 26, 2018

(65) Prior Publication Data

US 2018/0295788 A1    Oct. 18, 2018

Related U.S. Application Data

(63) Continuation of application No. 14/689,117, filed on Apr. 17, 2015, now Pat. No. 10,028,448, which is a continuation-in-part of application No. 14/413,451, filed as application No. PCT/US2013/049708 on Jul. 9, 2013, now Pat. No. 10,212,892, said application No. 14/689,117 is a continuation-in-part of application No. 14/670,653, filed on Mar. 27, 2015, now abandoned.

(60) Provisional application No. 61/980,829, filed on Apr. 17, 2014, provisional application No. 61/984,417, filed on Apr. 25, 2014, provisional application No. (Continued)

(51) Int. Cl.
*A01G 7/04*      (2006.01)
*H05B 45/20*   (2020.01)

(52) U.S. Cl.
CPC ............. *A01G 7/045* (2013.01); *H05B 45/20* (2020.01); *Y02P 60/14* (2015.11)

(58) Field of Classification Search
CPC ................................. A01G 7/045; A01G 7/04
See application file for complete search history.

(56) References Cited

U.S. PATENT DOCUMENTS 3,529,379 A    9/1970    Ware
4,250,666 A    2/1981    Rakestraw
(Continued)

FOREIGN PATENT DOCUMENTS

CN    1400863 A    3/2003
CN    101605413 A    12/2009
(Continued)

OTHER PUBLICATIONS

Kurtus, Background of Worldwide AC Voltages and Frequencies, Feb. 2010, retrieved from internet Jan. 6, 2020, School for Champions, (Year: 2010).*

(Continued)

*Primary Examiner* — Kristen C Hayes

(57) ABSTRACT

A method of stimulating plant growth in a controlled environment that includes providing a lighting assembly having a network of lighting elements such as light emitting diodes (LEDs) that provide light at a color tailored for an individual plant. The lighting assembly is positioned adjacent a plant such that the light produced is received by the plant. The lighting assembly additionally has a control assembly that includes driving circuitry that modulates the lighting elements to controllably provide predetermined periods of light and dark to stimulate continuous growth of the plant.

18 Claims, 7 Drawing Sheets

Related U.S. Application Data

61/669,825, filed on Jul. 10, 2012, provisional application No. 61/971,584, filed on Mar. 28, 2014.

(56) References Cited

U.S. PATENT DOCUMENTS

| | | | |
|---|---|---|---|
| 4,255,897 A | 3/1981 | Ruthner | |
| 4,441,145 A * | 4/1984 | Antkowiak | A01G 7/045 362/1 |
| 4,914,858 A | 4/1990 | Nijssen et al. | |
| 5,012,609 A * | 5/1991 | Ignatius | A01C 1/00 47/1.01 R |
| 5,241,781 A | 9/1993 | Malczyk | |
| 6,378,246 B1 | 4/2002 | Defoor | |
| 7,220,018 B2 | 5/2007 | Crabb et al. | |
| 8,074,397 B2 | 12/2011 | Yoneda et al. | |
| 8,302,346 B2 | 11/2012 | Hunt et al. | |
| 8,373,363 B2 | 2/2013 | Grajcar | |
| 8,410,725 B2 * | 4/2013 | Jacobs | H05B 33/0803 315/185 R |
| 8,531,136 B2 | 9/2013 | Grajcar | |
| 8,545,915 B2 | 10/2013 | Schroeder | |
| 8,547,391 B2 | 10/2013 | Maxik et al. | |
| 8,552,942 B2 * | 10/2013 | Hua | H05B 33/0815 345/77 |
| 8,568,009 B2 | 10/2013 | Chiang et al. | |
| 8,590,207 B1 | 11/2013 | Shih | |
| 8,596,804 B2 | 12/2013 | Grajcar | |
| 8,643,276 B2 | 2/2014 | Maxik | |
| 8,643,308 B2 | 2/2014 | Grajcar | |
| 8,651,691 B2 | 2/2014 | Grajcar | |
| 8,656,636 B2 | 2/2014 | Hunt et al. | |
| 8,729,832 B2 | 5/2014 | Maxik et al. | |
| 8,738,160 B2 | 5/2014 | Bucove et al. | |
| 8,754,832 B2 | 6/2014 | Maxik et al. | |
| 8,760,370 B2 | 6/2014 | Maxik et al. | |
| 8,847,514 B1 * | 9/2014 | Reynoso | A01G 7/045 315/307 |
| 8,850,742 B2 | 10/2014 | Dube | |
| 8,901,584 B2 | 12/2014 | Seo et al. | |
| 8,901,850 B2 | 12/2014 | Maxik et al. | |
| 9,010,018 B2 | 4/2015 | Wiggins et al. | |
| 9,545,060 B2 | 1/2017 | Wiggins et al. | |
| 9,700,019 B2 | 7/2017 | Grajcar et al. | |
| 10,028,448 B2 | 7/2018 | Grajcar et al. | |
| 10,070,594 B2 | 9/2018 | Brusatore | |
| 10,212,892 B2 | 2/2019 | Grajcar | |
| 2003/0004556 A1 | 1/2003 | Mcdaniel | |
| 2004/0065006 A1 | 4/2004 | Weder | |
| 2004/0230102 A1 * | 11/2004 | Anderson, Jr. | A01G 7/045 600/231 |
| 2005/0125887 A1 | 6/2005 | Taylor | |
| 2005/0135104 A1 | 6/2005 | Crabb et al. | |
| 2006/0113927 A1 | 6/2006 | Bondy et al. | |
| 2007/0058368 A1 | 3/2007 | Partee et al. | |
| 2007/0151149 A1 | 7/2007 | Karpinski | |
| 2008/0231204 A1 * | 9/2008 | Praiswater | H05B 33/0803 315/192 |
| 2008/0302004 A1 | 12/2008 | Lin | |
| 2009/0303706 A1 * | 12/2009 | Atehortua | A01G 7/045 362/231 |
| 2010/0020536 A1 * | 1/2010 | Bafetti | F21V 23/0457 362/231 |
| 2010/0043287 A1 * | 2/2010 | Jones | A01G 7/045 47/1.01 R |
| 2010/0076620 A1 * | 3/2010 | Loebl | A01G 9/26 700/306 |
| 2010/0244724 A1 * | 9/2010 | Jacobs | H05B 33/0803 315/253 |
| 2011/0001766 A1 * | 1/2011 | Hua | H05B 33/0815 345/690 |
| 2011/0101833 A1 | 5/2011 | Grajcar | |
| 2011/0109244 A1 | 5/2011 | Grajcar | |
| 2011/0179706 A1 | 7/2011 | Hunt et al. | |
| 2011/0183368 A1 | 7/2011 | Chapman et al. | |
| 2011/0193487 A1 | 8/2011 | Janik | |
| 2011/0209404 A1 | 9/2011 | Scott | |
| 2011/0210678 A1 | 9/2011 | Grajcar | |
| 2011/0228515 A1 | 9/2011 | Grajcar | |
| 2011/0241559 A1 | 10/2011 | Grajcar | |
| 2011/0273098 A1 | 11/2011 | Grajcar | |
| 2012/0020071 A1 | 1/2012 | Mckenzie | |
| 2012/0075848 A1 * | 3/2012 | Yamada | A01G 7/045 362/231 |
| 2012/0099305 A1 | 4/2012 | Bucove | |
| 2012/0104977 A1 | 5/2012 | Mckenzie et al. | |
| 2012/0170264 A1 | 7/2012 | Mckenzie et al. | |
| 2012/0192486 A1 | 8/2012 | Shanahan et al. | |
| 2012/0268918 A1 | 10/2012 | Grajcar | |
| 2012/0287617 A1 * | 11/2012 | Mekhtarian | A01G 7/045 362/228 |
| 2012/0326610 A1 | 12/2012 | Lawyer et al. | |
| 2013/0003382 A1 | 1/2013 | Ohura et al. | |
| 2013/0006401 A1 | 1/2013 | Shan | |
| 2013/0040380 A1 | 2/2013 | Hunt et al. | |
| 2013/0139437 A1 * | 6/2013 | Maxik | H05B 37/02 47/58.1 LS |
| 2013/0172963 A1 | 7/2013 | Moffat | |
| 2013/0229114 A1 | 9/2013 | Eisele et al. | |
| 2013/0255145 A1 | 10/2013 | Wiggins et al. | |
| 2013/0263503 A1 * | 10/2013 | Bostdorff | A01G 7/045 47/58.1 LS |
| 2013/0264934 A1 * | 10/2013 | Osaki | A01G 7/045 313/46 |
| 2013/0278445 A1 | 10/2013 | Quell et al. | |
| 2013/0326941 A1 * | 12/2013 | Pickett | A01G 7/045 47/1.4 |
| 2014/0069007 A1 | 3/2014 | Chen et al. | |
| 2014/0123555 A1 * | 5/2014 | McCord | A01G 7/045 47/58.1 R |
| 2014/0152194 A1 | 6/2014 | Beyer | |
| 2014/0165462 A1 | 6/2014 | Shigyo et al. | |
| 2014/0250778 A1 * | 9/2014 | Suntych | A01G 7/045 47/1.4 |
| 2015/0128488 A1 * | 5/2015 | Casper | F21V 9/30 47/58.1 LS |
| 2015/0128489 A1 * | 5/2015 | Yamada | A01G 7/045 47/58.1 LS |
| 2015/0150195 A1 | 6/2015 | Grajcar | |
| 2015/0216130 A1 * | 8/2015 | Grajcar | A01G 7/045 47/58.1 LS |
| 2015/0273235 A1 | 10/2015 | Grajcar | |
| 2016/0014974 A1 | 1/2016 | Grajcar et al. | |
| 2016/0100529 A1 | 4/2016 | Grajcar | |
| 2016/0109107 A1 | 4/2016 | Grajcar | |
| 2016/0113213 A1 * | 4/2016 | Berinsky | A01G 7/045 47/58.1 LS |
| 2016/0192597 A1 * | 7/2016 | Chang | A01G 9/26 362/249.01 |
| 2016/0205739 A1 | 7/2016 | Grajcar | |
| 2017/0071044 A1 * | 3/2017 | Aikala | H05B 33/0863 |
| 2018/0295787 A1 | 10/2018 | Grajcar | |
| 2018/0310497 A1 | 11/2018 | Farmer | |

FOREIGN PATENT DOCUMENTS

| | | |
|---|---|---|
| CN | 101682953 | 3/2010 |
| EP | 307991 A1 | 3/1989 |
| EP | 1626620 A1 | 2/2006 |
| EP | 2090154 A2 | 8/2009 |
| EP | 2181582 | 5/2010 |
| EP | 2278870 A1 | 2/2011 |
| EP | 2556745 A1 | 2/2013 |
| EP | 2609362 A1 | 7/2013 |
| EP | 2785171 A1 | 10/2014 |
| GB | 2220551 A | 1/1990 |
| JP | 08242694 A | 9/1996 |
| JP | 2001128571 A | 5/2001 |
| JP | 20002199816 A | 7/2002 |
| JP | 2003009662 A | 1/2003 |
| JP | 2004113160 A | 4/2004 |

(56) References Cited

FOREIGN PATENT DOCUMENTS

| | | |
|---|---|---|
| JP | 2005295955 A | 10/2005 |
| JP | 2006262817 A | 10/2006 |
| JP | 2008242694 A | 10/2008 |
| JP | 4308891 B1 | 8/2009 |
| JP | 2009261267 A | 11/2009 |
| JP | 2010536156 | 11/2010 |
| JP | 2011045286 A | 3/2011 |
| JP | 2011177127 A | 9/2011 |
| JP | 2011181484 A | 9/2011 |
| JP | 2013021981 A | 2/2013 |
| JP | 2013106550 A | 6/2013 |
| JP | 2014113145 A | 6/2014 |
| TW | 200621146 A | 7/2006 |
| WO | WO-1997030579 A1 | 8/1997 |
| WO | WO-2008118080 A1 | 10/2008 |
| WO | WO-2009022016 A1 | 2/2009 |
| WO | WO-2011086358 A2 | 7/2011 |
| WO | WO-2013041389 A1 | 3/2013 |
| WO | WO-2014011623 A2 | 1/2014 |
| WO | WO-2014011623 A3 | 1/2014 |
| WO | WO-2014085626 A1 | 6/2014 |
| WO | WO-2014098735 A1 | 6/2014 |
| WO | WO-2015148897 A1 | 10/2015 |
| WO | WO-2015161145 A1 | 10/2015 |
| WO | WO-2016014456 A1 | 1/2016 |
| WO | WO-2016061170 | 4/2016 |
| WO | WO-2016115235 A1 | 7/2016 |

OTHER PUBLICATIONS

"U.S. Appl. No. 14/413,451, Final Office Action dated Dec. 7, 2017", 6 pgs.

"U.S. Appl. No. 14/413,451, Non Final Office Action dated May 12, 2017", 8 pgs.

"U.S. Appl. No. 14/413,451, Notice of Allowance dated Jun. 4, 2018", 6 pgs.

"U.S. Appl. No. 14/413,451, Preliminary Amendment filed Jan. 19, 2015", 3 pgs.

"U.S. Appl. No. 14/413,451, Response filed Jan. 22, 2018 to Final Office Aciton dated Dec. 7, 2017", 6 pgs.

"U.S. Appl. No. 14/413,451, Response filed Jan. 27, 2017 to Restriction Requirement dated Dec. 2, 2016", 9 pgs.

"U.S. Appl. No. 14/413,451, Response filed Sep. 12, 2017 to Non Final Office Action dated May 12, 2017", 6 pgs.

"U.S. Appl. No. 14/413,451, Restriction Requirement dated Dec. 2, 2016", 7 pgs.

"U.S. Appl. No. 14/670,653, Final Office Action dated Dec. 22, 2016", 10 pgs.

"U.S. Appl. No. 14/670,653, Non Final Office Action dated May 26, 2016", 13 pgs.

"U.S. Appl. No. 14/670,653, Response filed Oct. 26, 2016 to Non Final Office Action dated May 26, 2016", 10 pgs.

"U.S. Appl. No. 14/689,117, Corrected Notice of Allowance dated May 1, 2018", 2 pgs.

"U.S. Appl. No. 14/689,117, Non Final Office Action dated Sep. 12, 2017", 9 pgs.

"U.S. Appl. No. 14/689,117, Notice of Allowance dated Mar. 29, 2018", 6 pgs.

"U.S. Appl. No. 14/689,117, Response filed Aug. 3, 2017 to Restriction Requirement dated Feb. 3, 2017", 5 pgs.

"U.S. Appl. No. 14/689,117, Response filed Dec. 12, 2017 to Non Final Office Action dated Sep. 12, 2017", 9 pgs.

"U.S. Appl. No. 14/689,117, Restriction Requirement dated Feb. 3, 2017", 7 pgs.

"Chinese Application Serial No. 201380041811, First Office Action dated Jan. 19, 2016", English Translation, 10 pgs.

"Chinese Application Serial No. 201380041811, Notice of Rejection dated Sep. 12, 2017", English Translation, 7 pgs.

"Chinese Application Serial No. 201380041811, Second Office Action dated Dec. 5, 2016", w. English Translation, 14 pgs.

"European Application Serial No. 13816914, search report dated Nov. 22, 2016", 17 pgs.

"International Application Serial No. PCT/US2013/049708, International Preliminary Report on Patentability dated Jan. 22, 2015", 7 pgs.

"International Application Serial No. PCT/US2013/049708, International Search Report dated Dec. 20, 2013", 2 pgs.

"International Application Serial No. PCT/US2013/049708, Written Opinion dated Dec. 20, 2013", 5 pgs.

"International Application Serial No. PCT/US2015/022939; International Preliminary Report on Patentability dated Oct. 13, 2016", 9 pgs.

"International Application Serial No. PCT/US2015/022939; International Search Report dated Jul. 9, 2015", 2 pgs.

"International Application Serial No. PCT/US2015/022939, Written Opinion dated Jul. 9, 2015", 7 pgs.

"International Application Serial No. PCT/US2015/026285, International Preliminary Report on Patentability dated Jul. 15, 2016", 7 pgs.

"International Application Serial No. PCT/US2015/026285, International Search Report dated Jul. 16, 2015", 2 pgs.

"International Application Serial No. PCT/US2015/026285, Written Opinion dated Jul. 16, 2015", 7 pgs.

"Japanese Application Serial No. 2015-521740 Notice of Rejection dated Mar. 13, 2017", 4 pgs.

Holick, M F, "Vitamin D: importance in the prevention of cancers, type 1 diabetes, heart disease, and osteoporosis", The American journal of clinical nutrition 79.3, (2004), 362-371.

U.S. Appl. No. 14/413,451 U.S. Pat. No. 10,212,892, filed Jan. 8, 2015, Light Sources Adapted to Spectral Sensitivity of Plant.

U.S. Appl. No. 16/018,512, filed Jun. 26, 2018, Light Sources Adapted to Spectral Sensitivity of Plant.

U.S. Appl. No. 14/670,653, filed Mar. 27, 2015, Devices and Method of Causing Chemical Reaction to Supplement Vitamin D Production.

U.S. Appl. No. 14/689,117 U.S. Pat. No. 10,028,448, filed Apr. 17, 2015, Light Sources Adapted to Spectral Sensitivity of Plants.

"U.S. Appl. No. 14/413,451, Corrected Notice of Allowability dated Jul. 3, 2018", 2 pgs.

"U.S. Appl. No. 16/018,512, Non Final Office Action dated Dec. 31, 2018", 7 pgs.

"U.S. Appl. No. 16/018,512, Preliminary Amendment filed Jul. 16, 2018", 4 pgs.

"International Application Serial No. PCT/US2015/041236, International Preliminary Report on Patentability dated Feb. 2, 2017", (Feb. 2, 2017), 7 pgs.

"International Application Serial No. PCT/US2015/041236, International Search Report dated Oct. 23, 2015", (Oct. 23, 2015), 2 pgs.

"International Application Serial No. PCT/US2015/041236, Written Opinion dated Oct. 23, 2015", (Oct. 23, 2015), 5 pgs.

"International Application Serial No. PCT/US2016/013224, International Search Report dated Mar. 10, 2016", (Mar. 10, 2016), 2 pgs.

"International Application Serial No. PCT/US2016/013224, Written Opinion dated Mar. 10, 2016", (Mar. 10, 2016), 4 pgs.

Roach, et al., "Regulation of Photosynthetic Electron Transport and Photoinhibition", Current Protein and Peptide Science, vol. 15, No. 4, (Apr. 28, 2014), 20 pgs.

U.S. Appl. No. 14/413,451, filed Jan. 8, 2015, Light Sources Adapted to Spectral Sensitivity of Plant.

U.S. Appl. No. 14/689,117, filed Apr. 17, 2015, Light Sources Adapted to Spectral Sensitivity of Plants.

* cited by examiner

LIGHT SOURCES ADAPTED TO SPECTRAL SENSITIVITY OF PLANTS

CROSS-REFERENCE TO RELATED APPLICATIONS

This application is a continuation of U.S. patent application Ser. No. 14/689,117, filed Apr. 17, 2015, which application claims the benefit of priority to U.S. Provisional Patent Application Ser. No. 61/980,829, filed Apr. 17, 2014, and claims the benefit of priority to U.S. Provisional Patent Application Ser. No. 61/984,417, filed Apr. 25, 2014, and is a continuation-in-part of U.S. patent application Ser. No. 14/413,451 filed Jan. 8, 2015, which is a U.S. National Stage Filing under 35 U.S.C. 371 from international application Serial No. PCT/US2013/049708 filed Jul. 9, 2013, which claims the benefit of priority to U.S. Provisional Patent Application Ser. No. 61/669,825 filed Jul. 10, 2012, all of which are incorporated in full herein; the U.S. patent application Ser. No. 14/689,117, filed Apr. 17, 2015, is also a continuation-in-part of and claims the benefit of priority to U.S. patent application Ser. No. 14/670,653 filed Mar. 27, 2015, which application claims the benefit of priority to U.S. Provisional Patent Application Ser. No. 61/971,584 filed Mar. 28, 2014, the benefit of priority of each of which is claimed hereby, and each of which are incorporated by reference in full herein.

BACKGROUND

This invention relates to plant growth. More specifically this invention relates to a method and assembly of radiating plants to enhance photosynthesis.

It is well known in the art that during the photosynthesis process plants absorb different frequencies of light to drive the photosynthetic process. In particular photosynthetically active radiation (PAR) is radiation in the spectral range from approximately 400 nanometers (nm) to 700 nm. Also known in the art is that chlorophyll, the most abundant plant pigment and the pigment responsible for plant metabolism is most efficient at capturing red and blue light.

During photosynthesis the chlorophyll pigments in a plant absorb photons in order to drive a metabolic process and dissipate excess energy within the photons. Simultaneously other pigments that are red/farred and blue/UV-A and UV-B photosensors or photoreceptors chemically react to adjust the behavior and development of the plant. Thus, by providing red and blue spectrum light, plants have been shown to grow at increased rates.

In addition, also known in the art is that plants need turn over, or time in the dark. In particular, when a pigment has accepted a photon that energy is transferred through an electron transfer chain (ETC) during which time additional photon energy cannot be dissipated via the ETC and instead is available to be dissipated through other harmful oxidation processes and the pigment accepts a charge. Still, when additional photons bombard the plant the pigments will continue to attempt to metabolize thus straining or fatiguing the plant. Thus dark time is needed to allow the pigments to complete the metabolic process and to restart the process. Thus just as humans need sleep, plants similarly need down time to optimize the metabolic process.

SUMMARY

A horticultural assembly for the growth of plants, including flowers. The assembly includes AC powered light source assemblies adjacent plants and adapted to the spectral sensitivity of plants. A light engine assembly is provided that is dimmable and through phase cutting can stop current from going to LEDs in the assembly to provide periods where no light is being emitted by the assembly. Further the light engine assembly includes a chip element that provides both red and blue light emitting diodes (LEDs) in series such that through phase cutting red and blue light emissions can be controlled.

A principle object of the present invention is to enhance growth characteristics in plants utilizing an AC power source.

Another object of the present invention is to provide cost effective lighting that enhances plant growth.

Yet another object of the present invention is to provide a lighting assembly that is used for multiple plants.

Another object of the present invention is to provide alternative methods of modulating light provided to plants to use of a DC power source.

These and other objects, features and advantages will become apparent from the rest of the specification.

DETAILED DESCRIPTION

Figure 1:
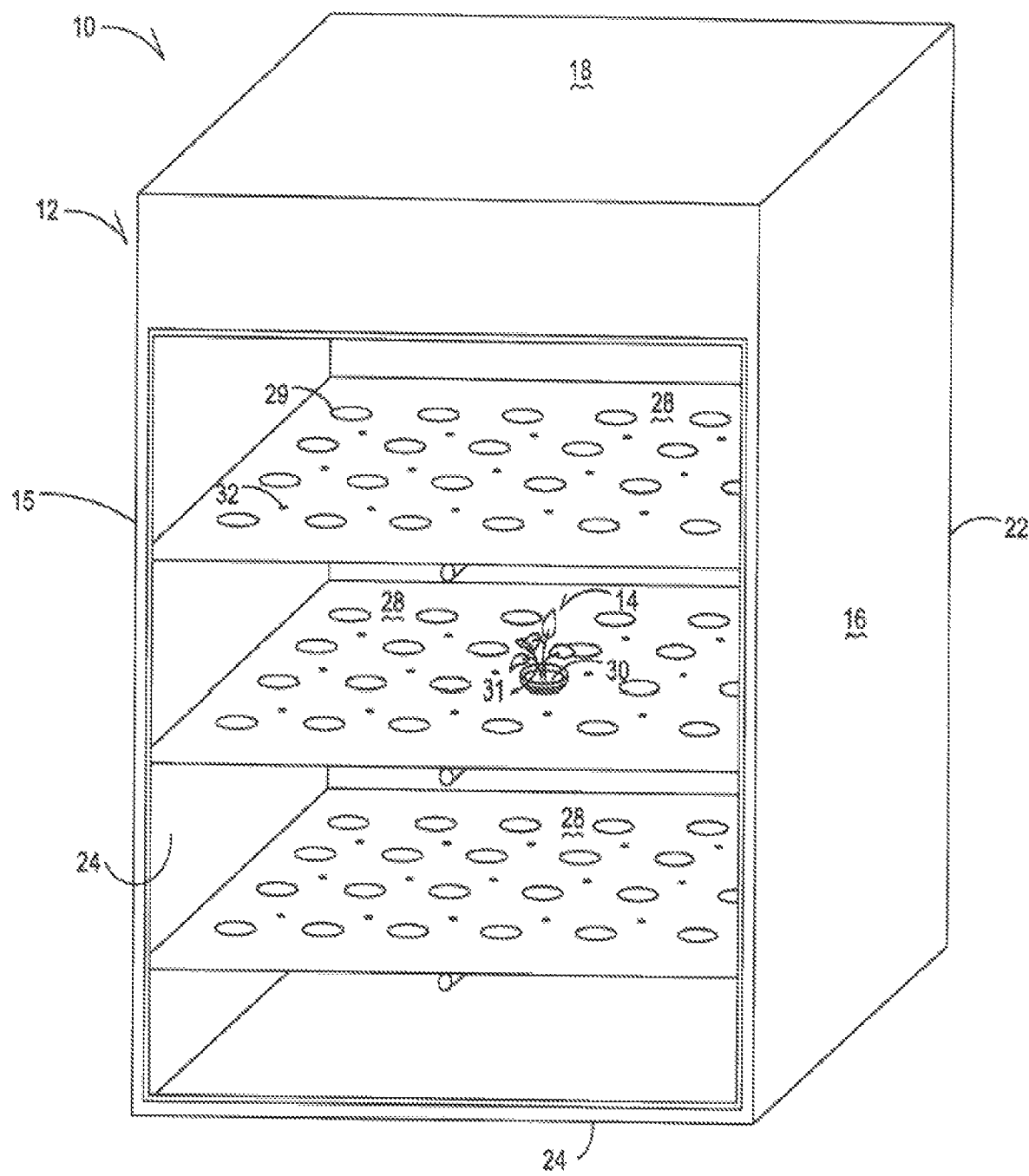
FIG. 1 is a side perspective view of a lighting assembly in a controlled environment for growing plant life.

As shown in FIG. 1 a horticultural assembly 10 can be at any location, including outdoors, in a green house, indoors or the like. The assembly 10 includes a container or space 12 where plants 14 that are typically planted in side by side relation are located. In one embodiment a container 12 is provided that is an incubating device that in one embodiment is generally rectangular in shape having first and second sidewalls 15 and 16 in paralleled spaced relation secured to top and bottom walls 18 and 20 also in paralleled spaced relation and a back wall 22 to form and hollow interior cavity 24. A front wall or door (not shown) is hingedly secured to a sidewall 14 or 16 to allow access to the interior cavity 24 of the container 12. Preferably the door is made of a transparent material to allow the interior cavity 24 to be seen, though in another embodiment the door completely encloses the interior cavity 24.

Disposed within the interior cavity 24 are a plurality of rotatable holding members or trays 28 having openings 29 that receive a plurality of soil masses 30 having seedlings 31 therein. In particular the soil masses 30 are of size and shape to be received and held by the openings 29 of the trays 28. The trays 28 rotate or tilt to various angles to ensure complete coverage of the lights on the soil masses 30 and seedlings 31.

A plurality of lighting elements 32 are secured to each tray 28 and electrically connected to one another. In a preferred embodiment the plurality of lighting elements 32 are light emitting diode elements that receive an AC input. In particular these assemblies incorporate AC driven LED technology from any one of the following patent applications: U.S. Pat. Pub. No. 2011/0101883 to Grajcar; U.S. Pat. Pub. No. 2011/0109244 to Grajcar; U.S. Pat. Pub. No. 2011/0210678 to Grajcar; U.S. Pat. Pub. No. 2011/0228515 to Grajcar; U.S. Pat. Pub. No. 2011/0241559 to Grajcar; U.S. Pat. Pub. No. 2011/0273098 to Grajcar; U.S. patent application Ser. No. 13/452,332 to Grajcar; and/or U.S. Pat. Prov. Appl. No. 61/570,552 to Grajcar, all of which are incorporated by reference in their entirety herein.

Figure 3:
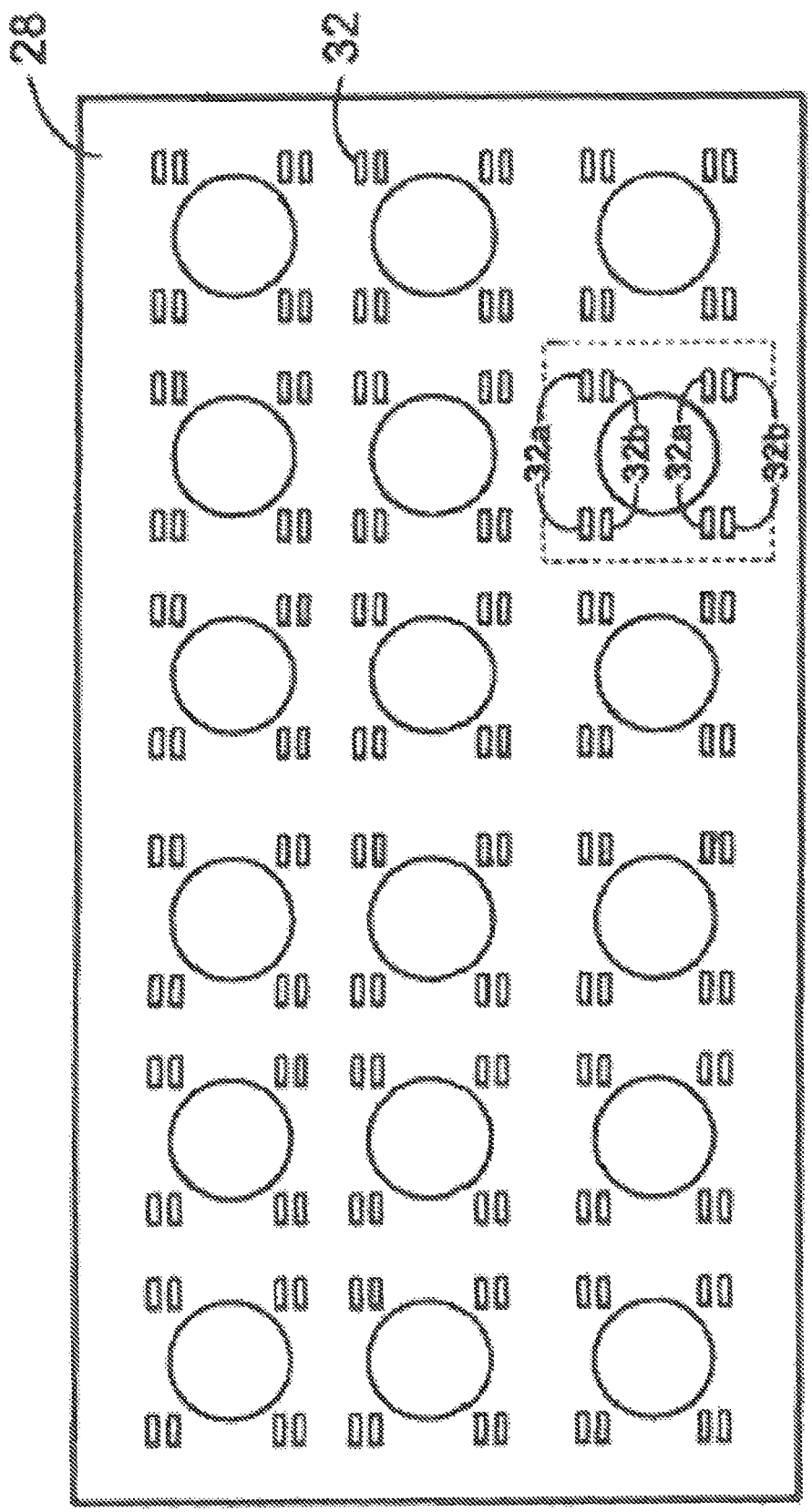
FIG. 3 is a top plan view of a tray of a lighting assembly for growing plant life.

In one embodiment, each lighting element 32 causes the emission of blue wavelength (450-495 nm) light, ultraviolet light and near ultraviolet light (350-450 nm), red light (620-750 nm) or electromagnetic radiation is utilized. Specifically, lighting elements 32 have electromagnetic radiation/ultraviolet/blue wavelength lighting elements and red wavelength elements combined on the same tray 28 as shown in FIG. 3 as lighting elements 32a and 32b. Such blue and red wavelength lighting elements 32a and 32b in one embodiment have light duration periods that are different. So, as an example, a first blue wavelength lighting element has a light duration period of 3 ms while a red wavelength lighting element has a light duration of 2 seconds.

Alternatively the lighting elements 32a and 32b have the same duration only staggered. As an example of this embodiment, a first blue wavelength lighting element 32a has a duration or period of 3 ms of light and 3 ms of dark. A second red wavelength lighting element 32b is also provided on the tray that also has a duration or period of 3 ms of light and 3 ms of dark. In one embodiment the first and second lighting elements emit light at the same time or present an overlap. In another embodiment, the second red wavelength lighting element is dark during the 3 ms the first blue wavelength lighting element is producing light. Then when the second red wavelength lighting element is producing light for 3 ms the first blue lighting element in dark and not emitting light.

The lighting elements 32 are powered by an electrical power source 33 and further have a dimming device 34 that causes the intensity of the light to be reduced to less than 3 lumens. Thus a constant low intensity wavelength light is emitted throughout the container 12. The light can be of a narrow frequency or monochromatic to direct the exact wavelength of light desired. In addition, while described as low intensity, a higher intensity wavelength of light can be provided. Further, in the embodiment where LED elements are utilized because of the properties of LED lighting elements, the lights can be left on for long durations of time.

While the intensity of the light can be reduced to less than 3 lumens, the intensity of the light similarly can be increased to output 800 lumens, 1000 lumens or more. Similarly, while light duration can be for long periods of time such as days, weeks or months, the duration between light and dark periods can also be controlled to hours, minutes, seconds and even ml seconds.

Figure 2:
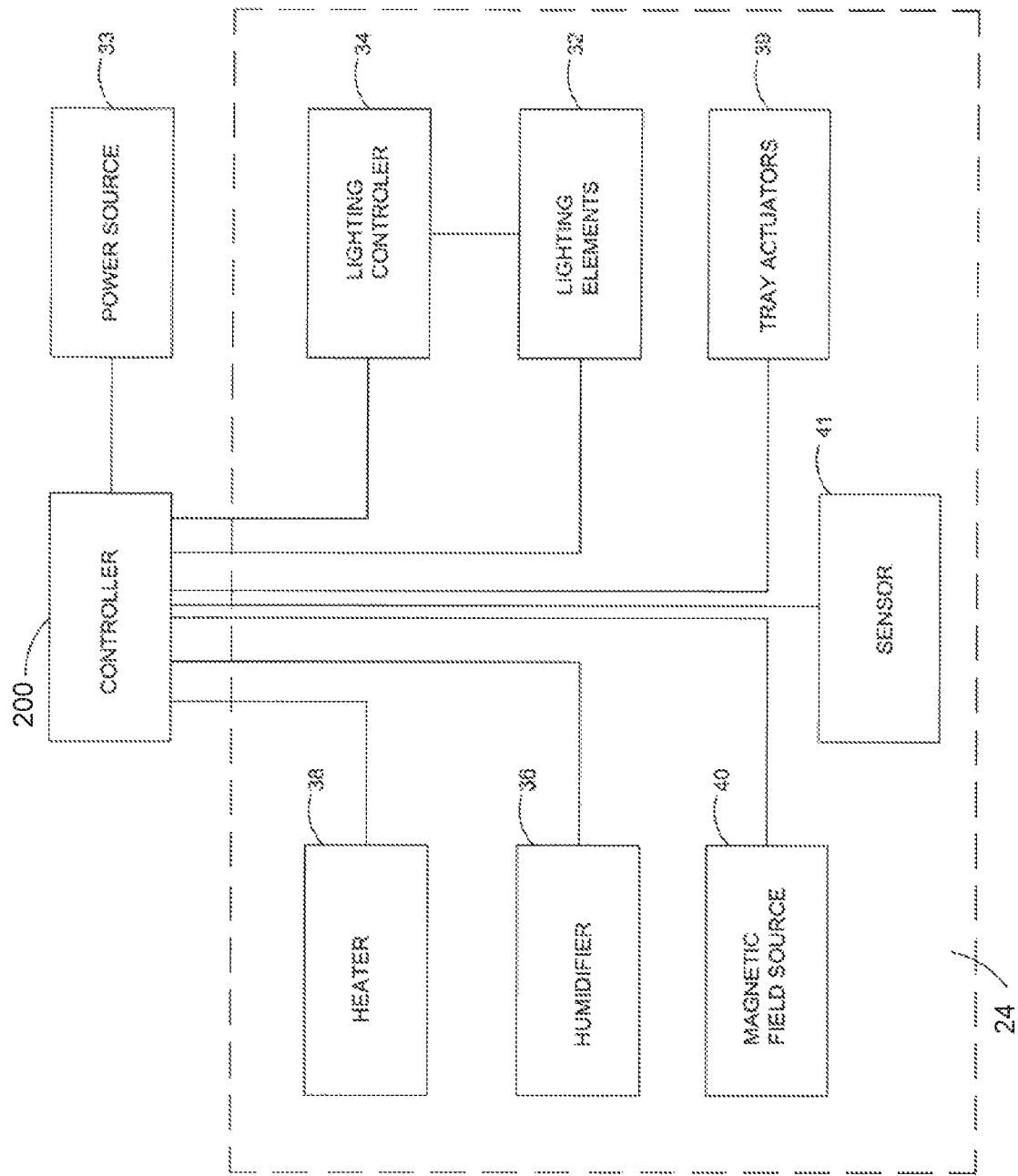
FIG. 2 is a block diagram of a lighting assembly for growing plant life.

A humidifying device 36 is also associated with the interior cavity 24 and preferable engages the top wall 18 and has a tubing element that can increase the humidity within the interior cavity 24 when the door 26 is closed. In this manner the humidity within the interior can be controlled to provide any relative humidity from 0% humidity to 100%, such that the humidity with the interior cavity 24 is predetermined. Preferably the humidity is approximately between 50-80%. A heating device 38 is also electrically connected to the power source 33, as depicted in FIG. 2, and disposed within the interior cavity 24 to provide a predetermined amount of heat within the interior cavity.

In one embodiment a magnetic device 40 is associated with the incubating device 10. In one embodiment the magnetic device 40 is within the interior cavity to form a predetermined magnetic flux through or affecting the seedlings and resulting plants 14.

While described as being planted in side by side relation, a single plant 14, or plurality of plants 14 planted in any relation to one another, is contemplated and does not fall outside of this disclosure. The lighting elements 32 in one embodiment are placed or mounted adjacent the plants 14 such that at least one plant receives radiation emitted by the lighting elements 32.

Figure 4:
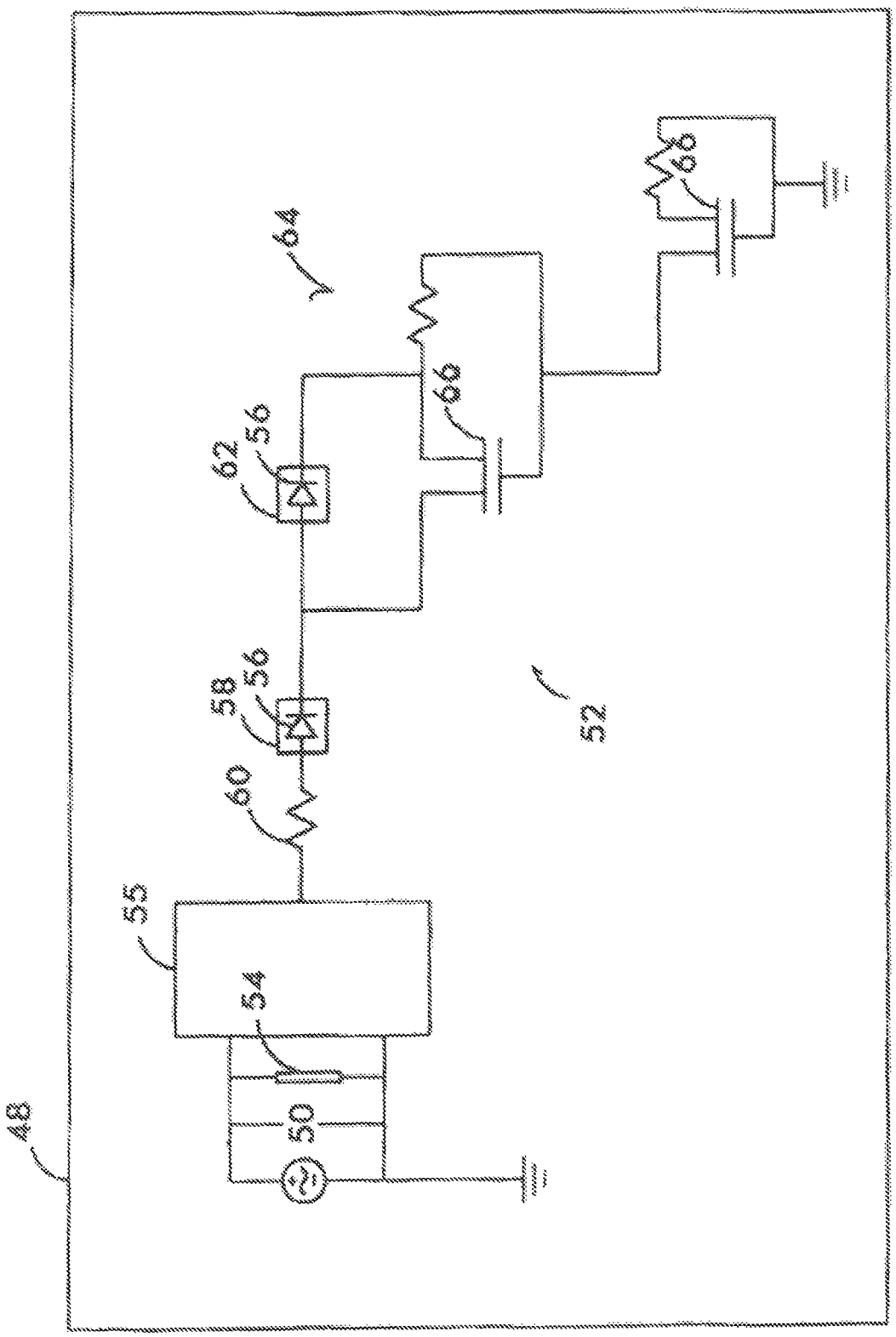
FIG. 4 is a schematic diagram of a circuit for a lighting assembly for growing plant life.

The lighting elements 32 are dimmable and are constructed as is described in U.S. patent application Ser. No. 12/824,215 to Grajcar and/or U.S. patent application Ser. No. 12/914,575 to Grajcar, both that are incorporated by reference herein. One such assembly, as an example only, is shown in FIG. 4 having an pair of input terminals 50 that are adapted to receive a periodic excitation voltage such that the terminals can receive AC current or a current of equal magnitude and opposite polarity, said current flowing in response to the excitation voltage to provide an AC input. The AC current is then conditioned by driving circuitry 52 that optionally includes an metal oxide varesistor (MOV) 54 and a rectifying device 55 that in a preferred embodiment is a bridge rectifier formed of a plurality of light emitting diodes (LEDs) 56.

The light emitting diodes (LEDs) 56 are arranged in a first network 58 where the first network 58 is arranged to conduct the current in response to the excitation voltage exceeding at least a forward threshold voltage associated with the first network 58. Optionally, depending on the driving circuitry 52, a resistor 60 or multiple resistors can be used to condition the current before reaching the first network 58. The LEDs 56 of the first network 58 can be of any type or color. In one embodiment the LEDs 56 of the first network 58 are red LEDs that produce light having a wavelength of approximately 600-750 nano meters (nm). In another embodiment the first network of LEDs are blue LEDs that produce light having a wavelength of approximately 350-500 nm. Alternatively both red and blue LEDs can be provided together or other colored LEDs such as green may similarly be used without falling outside the scope of this disclosure.

A second network 62 having a plurality of LEDs 56 is additionally provided in series relationship with the first network 58. The LEDs 56 of the second network 62 can be of any type or color. In one embodiment the LEDs 56 of the second network 62 are red LEDs that produce light having a wavelength of approximately 600-750 nano meters (nm). In another embodiment the second network of LEDs are blue LEDs that produce light having a wavelength of approximately 350-500 nm. Alternatively both red and blue LEDs can be provided together or other colored LEDs such as green may similarly be used without falling outside the scope of this disclosure.

A bypass path 64 is provided in the lighting element 32 that is in series relationship with the first network 58 and in parallel relationship with the second network 62. Also within the bypass path 64 are elements that provide a controlled impedance, which can be, for example only a transistor 66 that in one embodiment is a depletion MOSFET. Additional transistors, resistors or the like can be used within the bypass path 64 all that condition current to provide the smooth and continuous transition from the bypass path 64 to the second network 62.

Accordingly, it is appreciated from the disclosure herein that color temperature shifting as a function of input excitation waveforms may be implemented or designed based on appropriate selection of LED groups or networks 58 and 62 and arrangement of one or more selective current diversion conditioning circuits to modulate a bypass current around selected LED networks 58 and 62. The selection of the number of diodes in each group, excitation voltage, phase control range, diode colors, and peak intensity parameters may be manipulated to yield improved electrical and/or light output performance for a range of lighting applications.

The lighting elements 32 are able to be modulated using the dimming device 34 without utilization of a DC power source. In one embodiment as shown the dimming device 34 utilizes leading edge and falling edge phase cutting elements. As an example only a triac dimmer presents phase cutting at a leading edge while an IGBT dimmer presents phase cutting at a trailing edge. In this embodiment the dimming device having both leading edge and trailing edge phase cutting is in electrical communication with the driving circuitry 52. In this manner by utilizing both in a dimming device 34 a predetermined period of no current is provided. Thus a control device associated with the dimming device 34 can be used to determine the period of no current and thus period of dark.

In another embodiment the dimming device 34 includes at least one SCR silicon controlled rectifier) and in one embodiment first and second SCRs that are utilized to cut current provided for a predetermined period of time. The cut can occur at a zero phase angle or alternatively at an angle. Thus, by utilizing SCRs, the dimming device 34 again functions as a controllable on/off switch of the lighting elements 32. Specifically, in one embodiment the control device, such as a control knob is in communication with first and second SCRs such that the predetermined period of light and dark can be set at any predetermined time period from 0-30 minutes.

Figure 6:
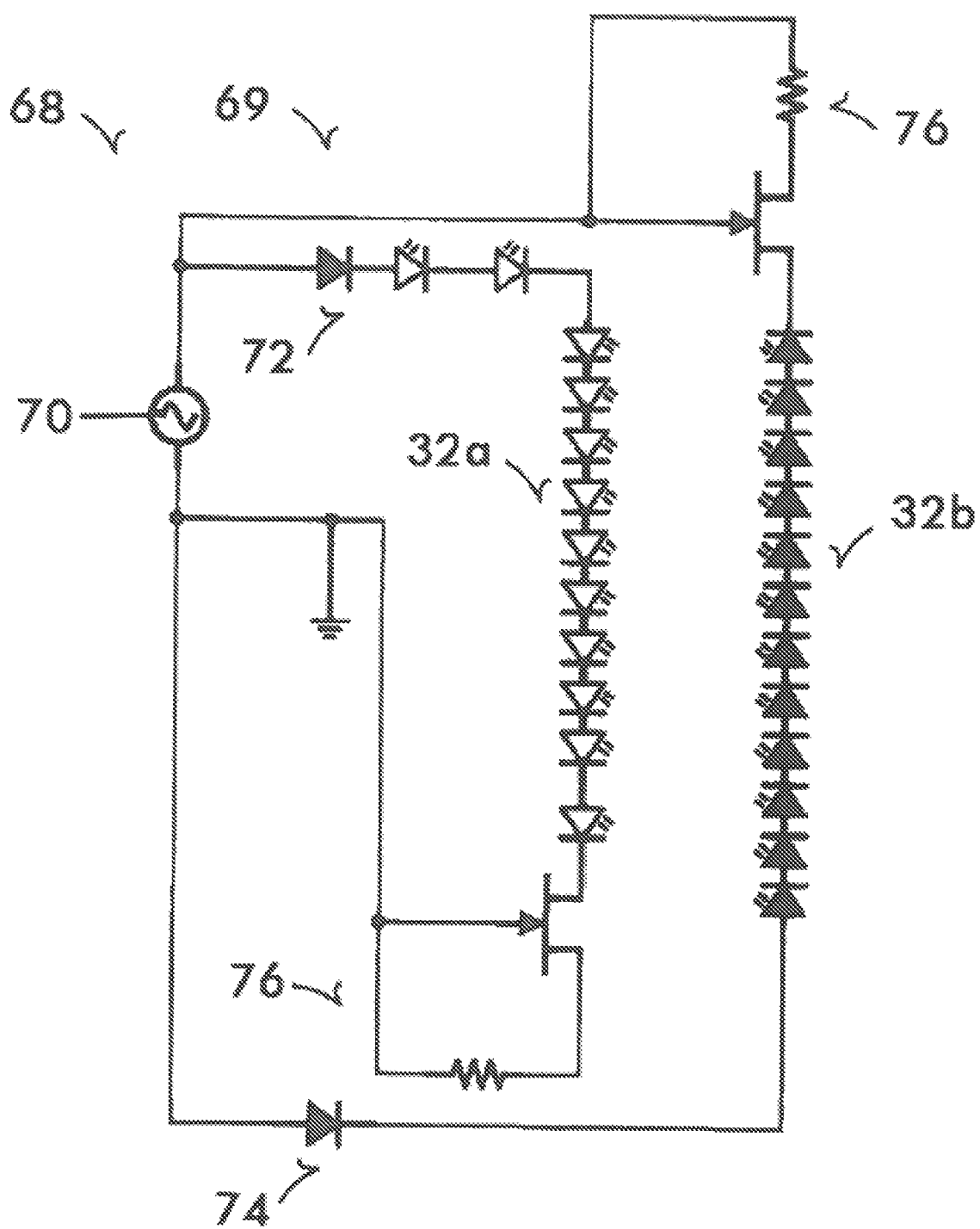
FIG. 6 is a schematic diagram of a circuit for a lighting assembly for growing plant life.

FIG. 6 shows an alternative embodiment that allows for the staggering of different lighting elements 32a and 32b. This embodiment shows a circuit 68 having an AC input 70 that provides AC current to driving circuitry 69 that includes a half of a bridge rectifier 72 to supply an input in a first plurality of lighting elements 32a that in one embodiment provide a red spectral output. Then in parallel the second plurality of lighting elements 32b receive an input from the AC input through a diode 74, such as a zener diode. Each group of lighting elements 32a and 32b also have additional current conditioning elements that in this embodiment are provided as a transistors with controlling resistors.

Figure 7:
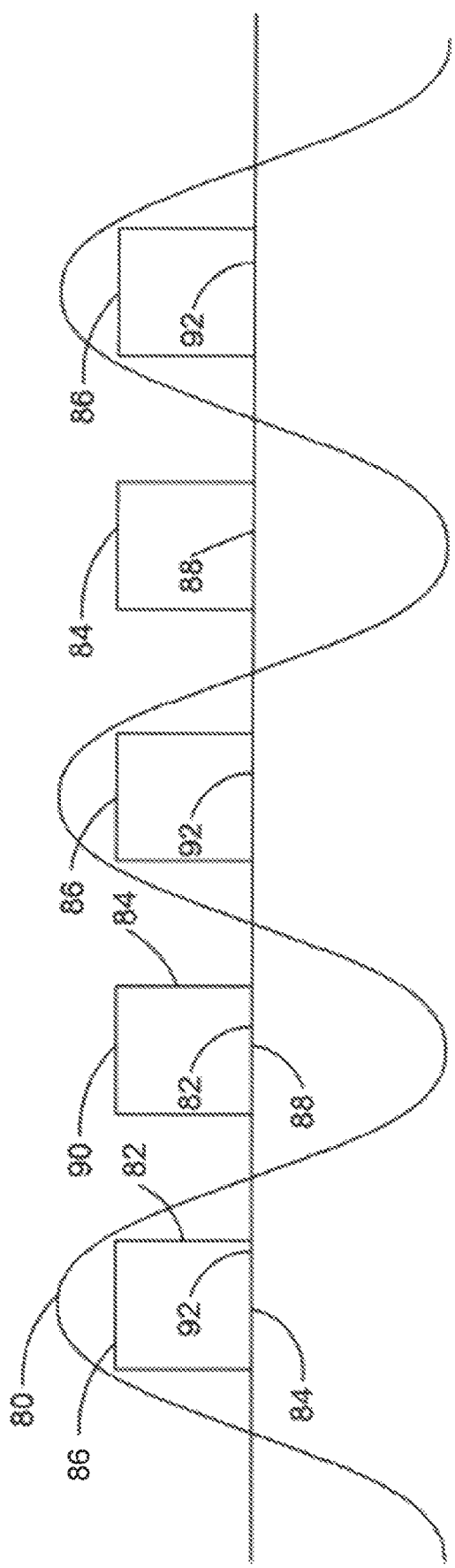
FIG. 7 is a graph showing the waveforms for the voltage and input currents for the circuit of FIG. 6.

Therefore, current inputted to the first and second lighting elements 32a and 32b is conditioned as shown in FIG. 7. FIG. 7 shows the voltage input 80 and current inputs 82 and 84 to lighting elements 32a and 32b resulting from circuit 68. The first current input 82 provides a maximum current input 86 when positive voltage is applied to the circuit and no current 88 when voltage input 80 drops below zero. Meanwhile, the second current input 84 provides a maximum current input 90 when voltage is negative, or below zero, while no current 92 is presented when the voltage is above zero or positive.

Consequently, with a single voltage source, the current frequency to each set of lighting elements 32a and 32b is offset such that during a period when no current is flowing to the first lighting elements 32a, causing darkness in first lighting elements 32a, current is flowing to second lighting elements 32b causing light to be provided by the second lighting elements 32b and vice versa. In this manner a human perceives continuous light, but the different chlorophylls A and B receive a period of wavelength of light it absorbs and then a period of light it does not absorb, and thus the individual pigments perceive light and dark periods.

In operation, one can study and determine the predetermined light and dark period for a specific plant, along with predetermined light wavelengths or colors for a plant that optimizes a characteristic of the plant, such as growth, yield or the like. Then lighting elements 32 are manufactured to present the predetermined light wavelength and the dimming device 34 can be adjusted to provide the optimum predetermined light and dark periods for optimum growth.

Figure 5:
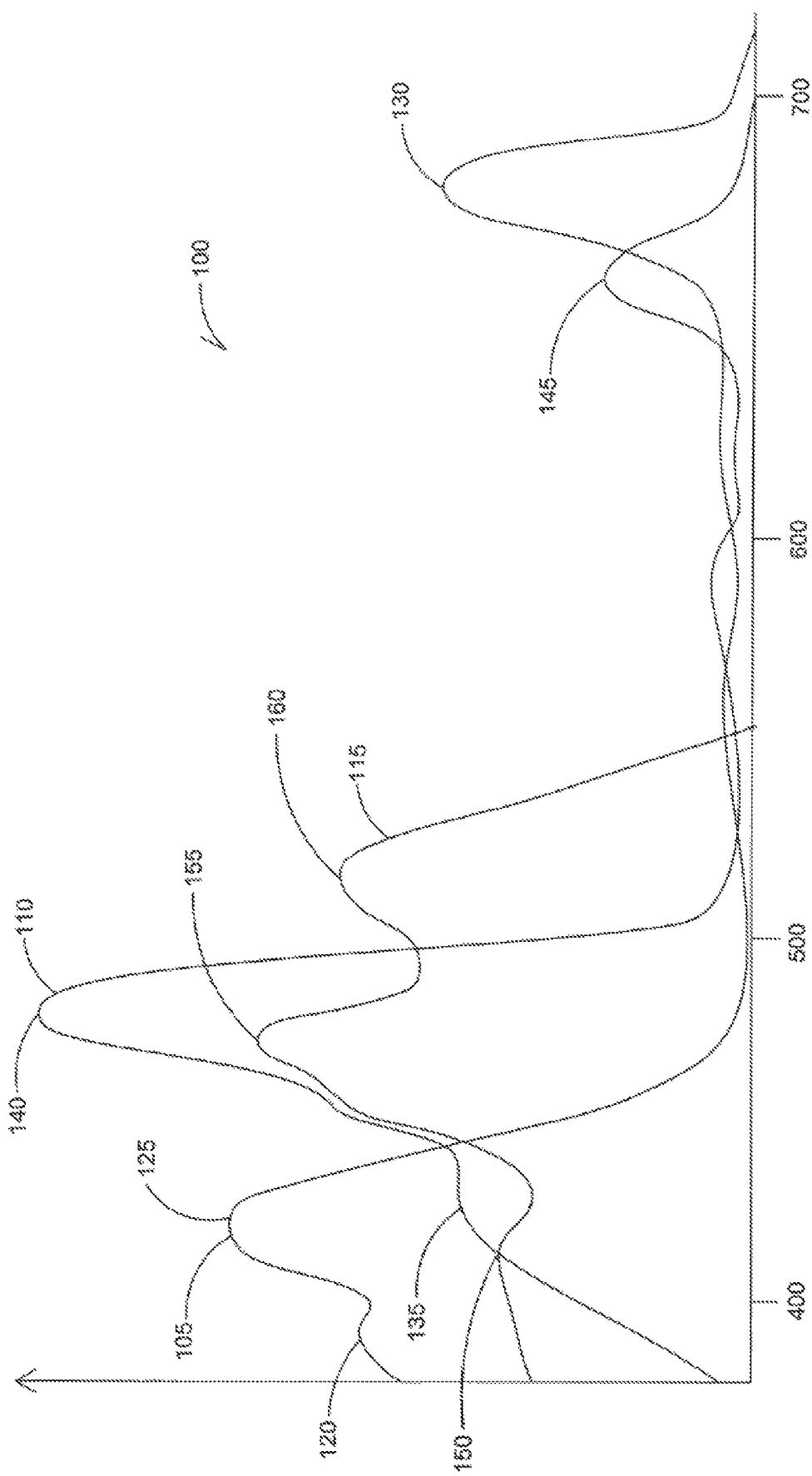
FIG. 5 is a graph showing amount of light absorbed by chlorophyll A, chlorophyll B and Carotenoids over a range of wavelengths.

In particular, most plants contain Chlorophyll A, Chlorophyll B or Carotenoids, or some combination of the three. Specifically, Chlorophyll A, Chlorophyll B and Carotenoids are pigments responsible for photosynthesis within plants. FIG. 5 shows an exemplary plot 100 of light absorbed by Chlorophyll A, Chlorophyll B and Carotenoids, as a function of wavelength as shown in curves 105 (Chlorophyll A), 110 (Chlorophyll B) and 115 (Carotenoids).

In FIG. 5, the curve 105 provides an exemplary representation of chlorophyll A receptiveness, or absorption of different wavelengths of light. Absorption appears with peaks evident in wavelengths between 380 and 780 nm. In this example, a first peak 120 of chlorophyll A occurs at about 390-395 nm, a second peak 125 occurs at about 410-415 nm and a third peak 130 occurs at about 690-695 nm. These examples are illustrative and not limiting.

For the chlorophyll B absorption curve 110 a first peak 135 occurs at about 420-425 nm. The second peak 140 occurs at about 470-480 nm with a final peak 145 occurring at about 665-670 nm. Again, these examples are illustrative and not limiting.

For the carotenoids absorption curve 115 a first peak 150 occurs at about 415-420 nm. The second peak 155 occurs at about 465-470 and a third peak 160 occurs at about 490-500 nm. Again, these examples are illustrative and not limiting.

Thus, during the selection process in manufacturing a horticultural assembly, a type of plant to be grown is analyzed to determine the concentration of chlorophyll A, chlorophyll B and/or carotenoids that exist in the particular plant to promote photosynthesis. Then a first lighting element or first plurality of lighting elements is selected having a narrow band of wavelengths that relate to a peak 120, 125, 130, 135, 140, 145, 150, 155 or 160 of a pigment (chlorophyll A, chlorophyll B or carotenoid) within the plant. Thus, in one embodiment when chlorophyll A is found in the plant a lighting element 32a is selected that presents the peak 125 of about 410-415 nm. Thus a light element 32a having a wavelength ranging from 400 nm to 425 nm is selected.

Once the lighting element 32a is selected to correspond to a peak absorption of the absorption curve 105, 110 or 115 of a predetermined pigment, the next step is to determine the amount of time needed for the pigment to complete the chemical reaction of photosynthesis after receiving the dose or duration of light to be provided. So, in the embodiment where chlorophyll A is the duration of time could be determined to be 3.5 ms. Alternatively, when a lighting element 32 is used that receives an input from an AC power source, the duration of time in one embodiment is controlled by the amount of hertz, or the frequency of the AC input.

Specifically, an AC input presents a sine wave where the input voltage is constantly fluctuating between zero volts and an operating voltage. When at zero volts the current stops flowing to the LEDs and a period of complete darkness is presented where no light is presented. However, when the frequency of the sine wave is increased the periods of time between light and complete darkness is reduced, to the point where, depending on the study conducted, humans are no longer able to perceive the periods of dark at a frequency of approximately 100 Hz. Thus, to an individual the light appears constant. However, at lower frequencies, such as 40 or 50 Hz, humans perceive the periods of darkness as visible flicker. Therefore the duration of time can be directly controlled by the frequency in which AC input voltage is supplied to the LEDs.

In an alternative embodiment the dimming device 34 is used to control the duration of time of LEDs light and complete darkness. In particular the light elements 32 are constructed to present a phase of a predetermined time duration depending on the modulation of the conditioned current provided to the lighting elements 32. In a preferred embodiment the phase is 24 ms. During this phase as a result of phase cutting, whether leading edge by a triac or other component and/or falling edge by a transistor such as a IGBT or the like, current is not supplied to LEDs for a predetermined amount of time or period, preferably between 3.5 to 14.5 ms during each 24 ms phase to create a dark or turnover period for 3.5 to 14.5 ms. During this 3.5 to 14.5 ms the plants 14 experience turnover time in order to optimize the photosynthesis process.

Thus provided are predetermined periods of light and dark that stimulate continuous growth of the plant. When used in the context of this application, predetermined periods of light and dark are measured or determined by what can be perceived by a plant 14 and represents periods when no light is being emitting by the lighting elements 32, even if the light or dark cannot be perceived by a human. Thus, flicker and unperceivable flicker present that is not perceived by humans is considered to provide a predetermined period of light and dark within the context of this disclosure.

In an alternative embodiment where the dimming device 34 is used to control time duration, first and second SCRs are utilized and the SCRs function as a controllable on/off switch of the lighting elements 32. Such functioning allows for a predetermined period of light and a predetermined period of dark. In one embodiment the predetermined period for both the light and dark is approximately 30 minutes. Specifically the dimming device 34 is in communication with the first and second SCRs such that the predetermined period of light and dark can be set at any predetermined time period from 0-30 minutes. Because an AC input is provided, the dark provided is a complete darkness where no photons are being produced as a result of no current being provided, unlike DC based flicker. In this manner one can control the pre-determined durations of light and dark to match the optimum requirements of specific plants.

Once the predetermined wavelength of the lighting element 32a is selected and the duration of time of light and dark is determined the manner in which the duration is accomplished is also selected. At this time the plant is again analyzed to determine the concentration of an additional pigment in the plant. Thus, in one embodiment the concentration of chlorophyll B is determined to select a second lighting element or plurality of lighting elements. As with the first lighting element, the second lighting element 32b is selected having a narrow band of wavelengths that relate to a peak 120, 125, 130, 135, 140, 145, 150, 155 or 160 of a pigment (chlorophyll A, chlorophyll B or carotenoid) within the plant. Thus, in the embodiment where chlorophyll B is a second pigment found in the plant a lighting element 32b in one embodiment is selected that presents a peak 145 or about 665-670 nm. Thus a second lighting element having a wavelength ranging from about 655 nm to 680 nm is selected. Alternatively, the second lighting element 32b is selected to provide an additional peak of chlorophyll A, such as third peak 130, that being wavelengths between 690 nm-695 nm.

Then, similar to the first selected lighting element 32a, the duration of time for the dose or amount of light needed to complete the chemical reaction of photosynthesis is determined. As this point a method of providing the needed duration of light and dark, as described above is provided for the second lighting element 32b. In this manner, both the first and second lighting elements 32a and 32b provide the exact wavelength of light and duration of light and darkness as the pigments required within the plant, thus optimizing plant growth. This method can similarly be used related to the carotenoid pigment.

In addition, another consideration is the intensity of each lighting element. In particular as intensity or lumens/m2 or lux on the plant 14 or seedling 31 increases the amount of energy being supplied to the plant 14 or seedling 31 is increased, thus lessening the amount of time needed to provide the proper dose, or energy needed to create the photochemical reaction, or photosynthesis.

In addition, during the duration of a day, or during the period in which light is provided to cause a photochemical reaction, the dose of energy required to cause the chemical reaction increases. Specifically, the dose needed to cause photosynthesis is dynamic. Therefore the amount of time needed to provide sufficient energy to cause the photochemical reaction or photosynthesis can actually increase during a day or over time, such that in the beginning of a period of lighting, the optimum dose is provided with a first predetermined amount of time, such as 3.5 ms and after a period of time such as 12 hours, a second predetermined amount of time, such as 14.5 ms of light is required.

Thus, by using a controller 200 that controls photoperiod, an algorithm for each plant 14 or seedling 31 can be provided that is specifically tailored or dynamically changes the frequency or photoperiod of the lighting elements 32 throughout a predetermined time period, such as twelve (12) hours, twenty-four (24) hours, forty-eight (48) hours or greater. By dynamically increasing the photoperiod to correspond with the dynamically changing requirements for the chemical reaction or photosynthesis to occur, the photosynthesis efficiency is enhanced and growing of the plant 14 or seedling 31 optimized.

Similarly, the intensity of the light can be dynamically changed by the controller 200, either by increasing and decreasing voltage and thus light output intensity or by having the controller 200 electrically connected to tray actuators 39 that mechanically raises and lowers the trays 28 to bring the lighting elements 32 closer or further away from the plants 14 or seedlings 31. In addition, a sensor 41 can be electrically connected to the controller 200 to determine the height of a plant 14 and automatically, and dynamically move the tray 28 away from the plant 14 to ensure the correct intensity is always provided to the plant.

Thus presented is a method and assembly 10 for illuminating a plurality of plants 14. The assembly 10 includes lighting elements 32 that provide a lighting cycle or phase that includes a predetermined amount of dark or turnover time for the plant. As a result the plant 14 gets the needed rest to relieve plant stress and strain during the completion of the metabolizing process. At this point the plant 14 is then ready to absorb more light to continue metabolizing in the photosynthesis process.

Meanwhile, by selecting wavelengths of light based on the absorption of such light by pigments within each plant the effectiveness of the metabolizing and photosynthesis is maximized. Specifically LEDs can comprise the different networks 58 and 62 of LEDs to create intermittent UV, near UV, blue light and/or red light in order to optimize the light received by the plants 14 according to the ideal PAR for that particular plant 14. As a result, not only can you have a 24 hour constant light growing cycle, but in addition the growth of the plant in maximized. The result is faster maturation and larger yield for the plats.

In addition, by controlling the frequency of an AC input or by using a dimming device 34 allows an individual to control the modulation or photoperiod of light for specific plants 14. Thus, if the optimum growing condition is to provide a period of 3.5 ms of light and 3.5 ms of dark, the control assembly 34 can be adjusted to provide this modulation. If a period of 30 minutes instead is required for maximum plant growth and enhancement of photosynthesis, the control device 34 can be adjusted and the assembly 10 can provide the modulation required. In this manner the assembly 10 can be used for numerous varieties of plants 14 without the need for a different assembly to be manufactured, thus improving on the state of the art.

Further, the assembly 10 that presents trays 28 that are presented in paralleled spaced relation with lighting elements 32 on each tray providing downward light to a plant below, also provides a secondary function. In particular, the driving circuitry 52 radiates heat directly into the tray 28 upon which the driving circuitry 52 is mounted. Thus the heat is directly conveyed from the tray 28 into the soil mass 30 that is disposed through the opening 29 within the tray 28. This provides additional heating for the soil mass 30 providing a more suitable growing environment.

In addition to enhancing the growth of the plants 14 and seedlings 31, the lighting element 32 similarly can cause enhancements in chemical reactions within fertilizer and nutrients within the soil mass 30. Specifically, the doses can be optimized, similar to the plants 14 and seedlings 31 to promote the conversion of nitrates and phosphates into simple proteins by making the bacteria responsible for the conversion more efficient, through enhancing the chemical reaction to stimulate mitochondria within the bacteria. In this manner growth within and out of the seedling 31 is enhanced as compared to a seedling not having the light treatment.

In addition the assemblies 10 are easily manufactured and incorporated into new and existing horticulture assemblies by mounting or placing them otherwise adjacent to the plants 14. Finally, because current is conditioned from an AC input is utilized and pulse width modulation eliminated, the cost associated with the lighting element 32 is greatly reduced. Thus, at the very least all of the stated objects have been met.

Applicant has conducted multiple experiments based on some of the principles outlined in the above disclosure. Specifically, two incubators were outfitted with red and blue lighting elements. In the first incubator, the trays where provided with 4 rows of LEDs, the first two rows being royal blue or approximately 450 nm and the third and fourth row being deep red or approximately 655 nm. The second incubator was made with identical trays with identical lighting. In the first incubator the LEDs were powered by a 100% DC input at a current of 150 mA and a lighting schedule or duration of time of 18 hrs on and 6 hrs off. The second incubator was powered by an AC input at 200 mA at 50% with a duration regulated by presenting a frequency of merely 50 Hz. This presents a flicker, with periods of less than a second, but with power on for 24 hours a day, thus 24 hours of perceived lighting for a human was provided.

Swiss chard was planted and allowed to germinate/sprout in darkness of 3 days. The incubator setting of each incubator was 90° F. with a 70% relative humidity. Then the lighting programs were used for 7 days. After 7 days the plants receiving the modulated light at 50 Hz for 24 hours presented noticeably greener leaves, larger and stronger root structures and noticeably bigger plants than those grown under the constant DC light for 18 hours and 6 hours of darkness. Thus the 24 hour lighting program actually produced the best plants. After running two tests, the enhanced growth was 30% greater growth in one experiment and 60% greater growth in a second experiment.

Another experiment was conducted on corn. Again, the seedlings 31 were provided with 16 hours of DC LED light and 8 hours of darkness in one incubator and exposed to 24 hours of pulsed light. The wavelengths provided in both incubators were identical to the test with the Swiss chard. Temperature, humidity and watering again were held constant along with the coulombs provided by both systems. After three days of growth, germination could not be detected for the DC LED 16 hour treatment while the 24 hour pulsed light showed growth. After four days the DC LED seedlings germinated with some plant growth, but the 24 hour pulsed light showed significant increases in size, leafiness and color compared to the DC LED light. Therefore again the system showed enhanced growth.

Thus, all of the stated objectives have been met and problems overcome.

What is claimed:

1. A lighting system of enhancing growth in plants comprising:
   an alternating current (AC) input providing an input voltage to provide an applied electrical excitation;
   a plurality of light emitting diodes (LEDs) arranged in a first network that receive a load current based on the applied electrical excitation;
   said plurality of LEDs in the first network producing a first light output at a first wavelength that is within 20 nm of a peak absorption of a first predetermined pigment of a plant;
   a plurality of LEDs arranged in a second network that receives the load current based on the applied electrical excitation;
   said plurality LEDs in the second network producing a second light output at a second wavelength that is within 20 nm of a peak absorption of a second predetermined pigment of the plant; and
   a control module electrically connected to the AC input to simultaneously modulate the first and second light outputs between light and dark wherein the predetermined periods of light and dark have a phase of 24 milliseconds (ms).

2. The system of claim 1 wherein the control module determines a frequency of the AC input.

3. The system of claim 2 wherein the AC input provided to the control module has a frequency of 60 Hz or less to modulate the first light output and the second light output.

4. The system of claim 1 wherein the control module is a dimming device.

5. The system of claim 1 further comprising:
driving circuitry receiving the input voltage from the AC input and conditioning the load current to provide a first input current to the first network and a second load current to the second network;
wherein during operation the first input current provides to the first network when the second input current provides no current to the second network.

6. The system of claim 1 wherein the first predetermined pigment is Chlorophyll A; and
the peak absorption wavelength of the first predetermined pigment is selected from a list consisting of 390 nm, 410 nm and 690 nm.

7. The system of claim 6 wherein the second predetermined pigment is Chlorophyll B.

8. The system of claim 6 wherein the second predetermined pigment is carotenoid.

9. The system of claim 1 wherein the first predetermined pigment is Chlorophyll B; and
the peak absorption wavelength of the first predetermined pigment is selected from a list consisting of 420 nm, 470 nm and 665 nm.

10. The system of claim 9 wherein the second predetermined pigment is Chlorophyll A.

11. The system of claim 9 wherein the second predetermined pigment is cartenoid.

12. The system of claim 1 wherein the first predetermined pigment is carotenoid; and
the peak absorption wavelength of the first predetermined pigment is selected from a list consisting of 415 nm, 465 nm and 490 nm.

13. The system of claim 12 wherein the second predetermined pigment is Chlorophyll A.

14. The system of claim 12 wherein the second predetermined pigment is Chlorophyll B.

15. The system of claim 1 wherein the second predetermined pigment is Chlorophyll A; and
the peak absorption wavelength of the second predetermined pigment is selected from a list consisting of 390 nm, 410 nm and 690 nm.

16. The system of claim 1 wherein the second predetermined pigment is carotenoid; and
the peak absorption wavelength of the second predetermined pigment is selected from a list consisting of 420 nm, 470 nm and 690 nm.

17. The system of claim 1 wherein the second predetermined pigment is carotenoid; and
the peak absorption wavelength of the second predetermined pigment is selected from a list consisting of 415 nm, 465 nm and 490 nm.

18. The system of claim 1 wherein a period of darkness in the predetermined periods of light and dark has a duration of 3.5 to 14.5 ms.

* * * * *